(12) United States Patent
Boivin

(10) Patent No.: US 12,432,047 B2
(45) Date of Patent: Sep. 30, 2025

(54) METHOD TO REQUEST SENSITIVE DATA FROM A RECIPIENT AND TO ESTABLISH A SECURE COMMUNICATION WITH THE RECIPIENT

(71) Applicant: SECURE EXCHANGES INC., Drummondville (CA)

(72) Inventor: Cedric Boivin, Drummonville (CA)

(73) Assignee: SECURE EXCHANGES INC., Drummondville (CA)

( * ) Notice: Subject to any disclaimer, the term of this patent is extended or adjusted under 35 U.S.C. 154(b) by 470 days.

(21) Appl. No.: 18/145,116

(22) Filed: Dec. 22, 2022

(65) Prior Publication Data

US 2023/0208619 A1    Jun. 29, 2023

Related U.S. Application Data

(62) Division of application No. 16/979,151, filed as application No. PCT/CA2019/050290 on Mar. 8, 2019, now Pat. No. 11,563,562.

(60) Provisional application No. 62/640,098, filed on Mar. 8, 2018.

(51) Int. Cl.
    *H04L 29/06* (2006.01)
    *H04L 9/08* (2006.01)
    *H04L 9/32* (2006.01)

(52) U.S. Cl.
    CPC .......... *H04L 9/0822* (2013.01); *H04L 9/0825* (2013.01); *H04L 9/0861* (2013.01); *H04L 9/0894* (2013.01); *H04L 9/3215* (2013.01); *H04L 2209/046* (2013.01)

(58) Field of Classification Search
    CPC ................. H04L 9/0822; H04L 9/0825; H04L 9/0861; H04L 9/0894; H04L 9/3215; H04L 2209/046; H04L 63/0428; H04W 12/02; H04W 12/03
    See application file for complete search history.

(56) References Cited

U.S. PATENT DOCUMENTS

| 9,686,251 | B2 * | 6/2017 | Marinkovic | G06Q 20/3823 |
| 9,973,481 | B1 * | 5/2018 | Sharifi Mehr | H04L 9/0825 |
| 10,798,064 | B1 * | 10/2020 | Scotney | G06F 16/955 |
| 2009/0006851 | A1 * | 1/2009 | Freeman | H04L 63/126 |
| | | | | 713/170 |
| 2011/0314371 | A1 * | 12/2011 | Peterson | G06F 40/186 |
| | | | | 715/234 |

(Continued)

*Primary Examiner* — Yogesh Paliwal
(74) *Attorney, Agent, or Firm* — Brouillette Legal Inc.; Philippe Brouillette

(57) ABSTRACT

The present system and method allow the exchange of messages, such as email, between a sender and a recipient while maintaining the data secure and the integrity of the content of the messages. The method and system do not require a user having an account to open a received message. The method comprises the server creating a new communication key upon reception of a request. The communication key is typically valid for a single request to ensure that each request is encrypted using different communication keys. The method typically comprises a client [A] establishing communication on [HANDSHAKE] with one or more servers [B]. The HANDSHAKE generally aims at initializing the encryption key that will be used to exchange information between A and B.

14 Claims, 5 Drawing Sheets

(56) References Cited

U.S. PATENT DOCUMENTS

| | | | |
|---|---|---|---|
| 2014/0082523 A1* | 3/2014 | Duquene | G06F 16/176 |
| | | | 715/753 |
| 2015/0012287 A1* | 1/2015 | Vucovich | G16H 10/65 |
| | | | 705/2 |
| 2015/0199541 A1* | 7/2015 | Koch | H04W 12/06 |
| | | | 726/29 |
| 2018/0176193 A1* | 6/2018 | Davis | H04L 9/3247 |
| 2018/0176197 A1* | 6/2018 | Matthews | H04L 63/0807 |
| 2019/0012467 A1* | 1/2019 | Richardson | H04L 9/0894 |
| 2019/0199693 A1* | 6/2019 | Vityaz | G06F 9/48 |

* cited by examiner

METHOD TO REQUEST SENSITIVE DATA FROM A RECIPIENT AND TO ESTABLISH A SECURE COMMUNICATION WITH THE RECIPIENT

CROSS-REFERENCE TO RELATED APPLICATIONS

The present patent application is a division of the U.S. patent application Ser. No. 16/979,151, entitled "System and method for securely exchanging messages" and filed at the United States Patent and Trademark Office on Sep. 8, 2020, which is a 371 of the PCT Patent Application no. PCT/CA2019/050290 filed on Mar. 8, 2019, which claims the benefits of priority of U.S. Provisional Patent Application No. 62/640,098, entitled "System and method for securely exchanging messages" and filed at the United States Patent and Trademark Office on Mar. 8, 2018.

FIELD OF THE INVENTION

The present invention generally relates to systems and methods for securely exchanging messages. More specifically, the present invention relates to systems and methods for users exchanging messages using point-to-point encryption without using an encryption certificate installed on their device.

BACKGROUND OF THE INVENTION

In the current digital communication era, companies exchange hundreds of billions of data per day on a global scale through different systems. Security should be at the heart of those exchanges since several of them are confidential and/or should be treated in a confidential manner.

Regardless of the type of communication, the data exchanged should be encrypted to ensure maximum confidentiality and to protect the said data from each of the different "stakeholders." Even if the data exchanged passes through thousands of systems around the world, each of these servers does not have the same level of security.

There are several applications to improve the security of communications and maintain their efficiency. However, these applications require the installation of software on the computer of each party. This installation can be problematic in many scenarios and can greatly complicate the communication process in cases where the recipient is not known. For companies, the most popular method of communication is still the email. For the year 2016, more than 215 billion of emails (excluding spam) were sent on average each day.

The SMTP protocol was developed in the 1980s, the Stone Age of the Internet. At that time, the communication protocol was not designed to exchange sensitive or confidential information. Although it is possible to encrypt messages directly from a messaging client software, the recipient must have the sender's digital signature or key in possession to decrypt the encrypted sender's emails. This technique is therefore barely used because it substantially increases the complexity of the communication configuration and is very little scalable due to this complexity.

There is, therefore, a need for a system and a method to simplify the point-to-point encryption process of the exchanged data without installing software or an application on the sender's and the recipient's devices.

SUMMARY OF THE INVENTION

The shortcomings of the prior art are generally mitigated by a system and methods for securely exchanging messages.

In one aspect of the invention, a system and method allowing the exchange of messages, such as email, between a sender and a recipient while maintaining the data secure and the integrity of the content of the messages is provided. The method and system do not require a user having an account to open a received message.

The method comprises the server creating a new communication key upon reception of a request. The communication key is typically valid for a single request to ensure that each request is encrypted using different communication keys. The method typically comprises a client [A] establishing communication on [HANDSHAKE] with one or more servers [B]. The HANDSHAKE generally aims at initializing the encryption key that will be used to exchange information between A and B.

The method may further comprise A creating an RSA key and initializing the connection. During initialization of the connection or handshake, A transmits its public key [PK1] to B. The method further comprises B creating an RSA key and, if necessary, associating the created key with an ID as a reference.

The method further comprises B transmitting the public key referring to the ID [PK2] to A. The method further comprises B creating a half key [COMKEY1]. Upon creating COMKEY, B returns the following information to A: PK2, ID, and COMKEY1. The method further comprises B encrypting PK2, ID and COMKEY1 using the public key PK1 and B sending the encrypted PK2, ID and COMKEY1 information to A. Upon reception of the encrypted information, A may decrypt the information using a private key. After decrypting the information, A may forge or create a half key [COMKEY2]. A uses the public key of B (PK2) to send a request to B and to share the COMKEY2 value. A sends COMKEY2 to B.

B now has the complete definition of the algorithm to assemble the COMKEY by combining COMKEY1 and COMKEY2.

In one aspect of the invention, a method for securing an electronic message is provided. The method comprises the client device creating a first key unknown to by the server, the first key having at least two portions, encrypting sensitive information using the first key, communicating a communication message comprising a first of the portions of the first key and the encrypted sensitive information to the server, storing the sensitive information on the server, generating parameters associated with the stored sensitive information, the parameters comprising a unique identification associated with the stored sensitive information, communicating the parameters to the client device, the client device further adding a second of the portions of the first key to the received parameters, the client device creating an electronic message comprising the completed parameters and the client device sending the created electronic message to a recipient.

The method may further comprise altering the second portion of the first key prior to completing the parameters. The second portion of the first key may be altered using a unique code. Altering the second portion of the first key may further comprise executing a XOR mask function with the unique code on the second portion of the first key. The method may further comprise discarding the unique code after altering the second portion of the first key. The method may further comprise recreating the unaltered second portion of the first key using the unique code. Recreating the unaltered second portion of the first key may further comprise executing a XOR mask function with the unique code on the altered second portion of the first key.

The method may further comprise creating a second key known to the client device and to the server device, wherein the communication key is used to encrypt communications between the client device and the server. The creation of the second key may further comprise generating a first portion of the second key, encrypting the first portion of the second key, sending the first portion of the second key to the client device, the client device decrypting the encrypted first portion of the second key, upon reception of the first portion of the second key, generating a second portion of the second key, encrypting the second portion of the second key, sending the second portion of the second key to the server, the server device decrypting the encrypted second portion of the second key and the server and the client device each creating the second key by combining the first and second portions of the second key.

The first portion of the second key may encrypted with a public key associated with the server and the second portion of the second key may be encrypted with a public key associated with the client device. The method may further comprise the client device sending the public key associated with the client device to the server and the server sending the public key associated with the server to the client device. The reception of the public key associated with the client device by the server may be triggered by the generation of the first portion of the second key.

The method may further comprise associating a unique identification with at least one of the portions of the second key. The unique identification may be encrypted with either the first or the second portion of the second key.

The storing of the sensitive information on the server may further comprise generating a storage key used to encrypt the sensitive information on the server. The generation of the storage key may further comprise generating a first portion and a second portion of the storage key, storing the first portion of the storage key on the server and communicating the second portion of the storage key to the client device. The second portion of the storage key being may be encrypted with the second key. The completion of the parameters may further add the second portion of the storage key. The method may further comprise a recipient sending a request to the server by accessing the completed link, the server retrieving the second portion of the storage key from the link, the server retrieving the first portion of the storage key and the server decrypting the sensitive information using the first and second portions of the storage key.

The method may further comprise the created electronic message being communicated to an external messaging system (EMS) and the EMS sending the electronic message to the recipient. The method may further comprise requesting a public key from the EMS, the EMS generating the requested public key and sending the generated public key of the EMS to the client device. The method may further comprise the server encrypting the public key of the EMS with the communication key and the server sending the encrypted public key of the EMS to the client device. The method may further comprise encrypting the completed link using the public key of the EMS. The method may further comprise encrypting the electronic message using the public key of the EMS and sending the encrypted message to the EMS.

The method may further comprise the server generating a partial link comprising the parameters, communicating the partial link to the client device and the client device further completing the partial link by adding at least the second of the portions of the first key to the partial link.

In another aspect of the invention, a method for a recipient device to retrieve a secure electronic message is provided. The method comprises the recipient device receiving a secured access to the secured message, retrieving parameters associated with the secured access, the retrieved parameters comprising identification of the secure message and a first portion of an end-to-end key, the recipient device requesting the secured message associated with the identification of the secure message to the server, sending content of the secured message encrypted with the end-to-end key and a second portion of the end-to-end key to the recipient device, the recipient device combining the known first portion of the end-to-end key and the received second portion of the end-to-end key to forge the end-to-end key and using the end-to-end key to decrypt the content of the secured message.

The method may further comprise creating a communication key known to the recipient device and to a server device, wherein the communication key is used to encrypt communications between the recipient device and the server. The retrieved parameters may further comprise a public key of a secure outgoing mail server (SEMS) and the other parameters being encrypted with the public key of the SEMS, the method further comprising the SEMS decrypting the retrieved parameters using a private key associated with the public key of the SEMS and communicating the decrypted parameters to the recipient device. The retrieved parameters may further comprise an identification of the public key of the SEMS and the method may further comprise the SEMS retrieving a private key associated with the identification of the public key of the SEMS. The secured message may be associated with a unique code used to alter the first portion of the end-to-end key, the method further comprising retrieving the unique code through another channel of communication and using the unique code to create an unaltered first portion of the end-to-end key.

The method may further comprise creating a XOR mask based on the retrieved unique code and executing the XOR mask on the altered first portion of the end-to-end key. The retrieved parameters may further comprise a storage key and the sending of the content of the secured message encrypted may further comprise decrypting the content of the secured message using the storage key.

The retrieved parameters may further comprise only a first portion of the storage key. The method may further comprise the server fetching a second portion of the storage key associated with the received portion of the storage key, forging the storage key with the first and second portions of the storage key and decrypting the secured message with the forged storage key.

The reception of the secured access to the secured message may further comprise the server sending a link to the secure message in an electronic message.

In yet another aspect of the invention, a method to request sensitive information from a recipient and to establish a secure communication with the recipient is provided. The method may comprise a client device sending a request for an envelope to a server, the server creating the envelope, sending to the recipient device an access to the envelope, the recipient device filling the envelope with sensitive data, storing and encrypting the sensitive data on the server using a first key known only by the server and sending to the client device a secured access to the sensitive information, the communication to the secured access being encrypted with a second key known to the server and to the client device.

The method may further comprise generating a first link to the envelope to provide the access to the envelope and sending the generated first link to the recipient device. The method may further comprise generating a second link to the sensitive information to provide the secured access to the sensitive information, encrypting the second link with the second key and the client device gaining the secure access to the sensitive information through the second link. Sending the first link to the recipient device may further comprise sending the first link to the client device and the client device sending the received first link to a device of a recipient;

The method may further comprise adding callback parameters to the requested envelope. The callback parameters may be provided as one or more objects. The server may encrypt the callback parameters in the created envelope. The client device may provide the callback parameters in the request for the envelope. The server may execute one or more actions associated with the callback parameters. The server may communicate the callback parameters to a service provider server configured to execute predetermined rules associated with the received callback parameters.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE INVENTION

Figure 1:
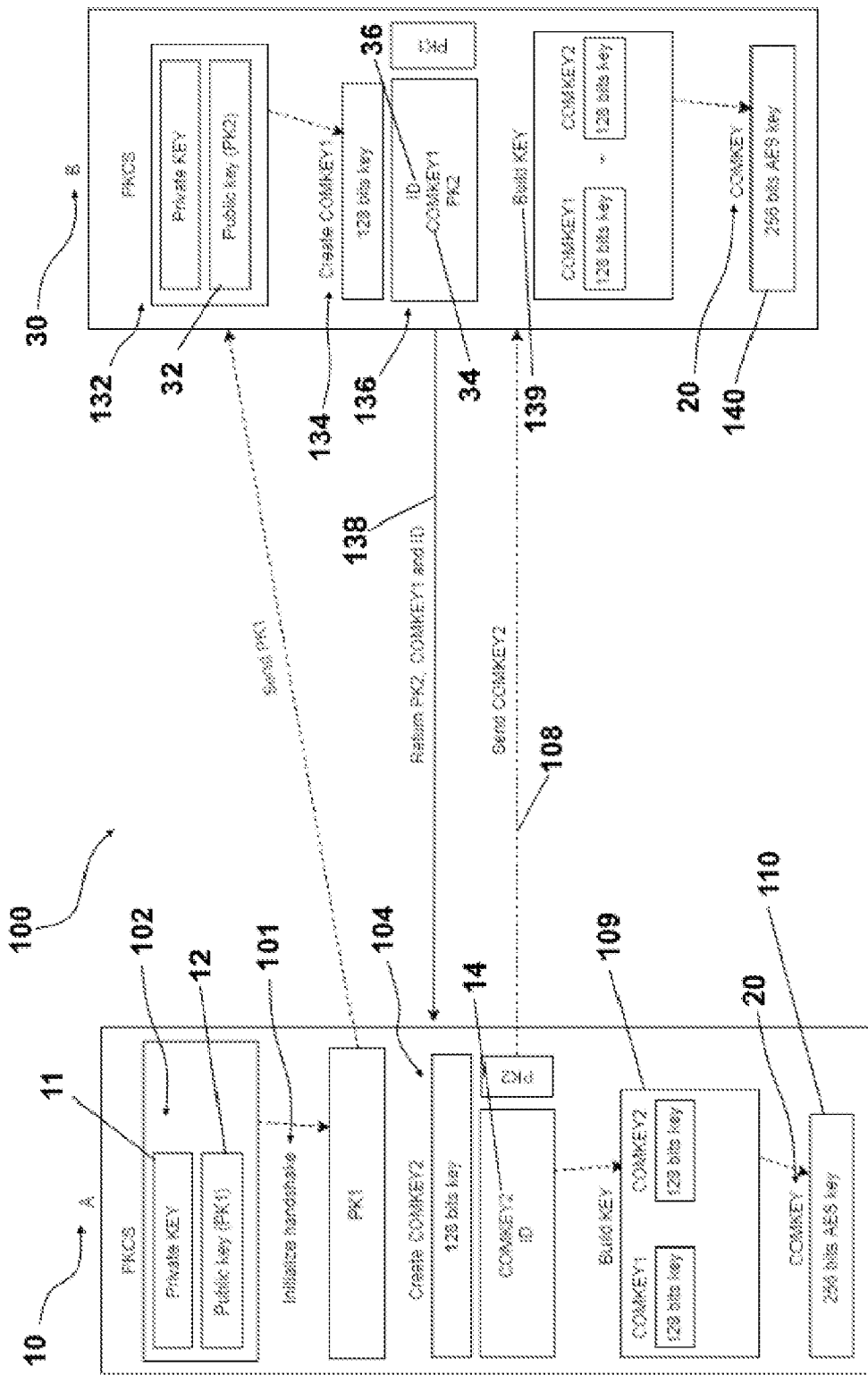
FIG. 1 is a diagram of the handshake and the creation of a COMKEY in a method and system for securely exchanging messages in accordance with the principles of the present invention.

A novel system and method for securely exchanging messages will be described hereinafter. Although the invention is described in terms of specific illustrative embodiments, it is to be understood that the embodiments described herein are by way of example only and that the scope of the invention is not intended to be limited thereby.

The method for securely exchanging messages of the present invention generally aims at minimizing changes to the habits of a typical email user. Current systems require the creation of an account upon the reception of an email. Such systems typically recreate an inbox on the server of the system to ensure that the email is kept on the secure server until the user erases it.

The provided method and system for securely exchanging messages does not keep nor store the message to be exchanged. One skilled in the art should understand that it is not trivial to request that the recipient of the email shall always be requested to create a username and password or to at least request the user to provide an existing username and password every time an email is received." Such prior art method may become cumbersome for the user as a user typically tend to forget its user credentials, especially if such user seldomly uses the message exchange system. The present system and method do not require a user having an account to open a received message. In a preferred embodiment, the system typically comprises three levels of security.

Easy mode: A recipient receives a link configured to open the message.

Secure mode (SMS or password): A recipient receives a link in combination with another mean of security, such as a password or a code received using another mean of communication, such as a SMS code. The other means of security is typically configured for the user sending the message or the sender.

Ultra secure mode (SMS and password): A recipient receives a link to open the message. At the time of reception, the recipient must know the password and the SMS code.

Understandably, in other embodiments, any number of security levels may be used without being outside of the scope of the present invention.

Secure Exchanges

In a preferred embodiment, a system for securely exchanging messages is implemented as a SaaS (software as a service) service. The system typically comprises a layer of security added over or to the standard SMTP protocol. Such layer of security is configured to remove sensitive content from the original message and keeping said message on a secure server. The content is therefore encrypted, typically using random symmetric keys, such keys being only known to the sender and the recipient. The system is configured for a user to modify or change an original message, such as an email, to be secure.

Although the current invention may be used with all messaging technologies, the examples below use emails. A skilled person in the art would understand that the present method and system may be used to secure any type of exchanged data. For instance, such exchanged data may secure exchanges between servers, applications, emails or any combination of such technologies.

Understandably, the method or system is not limited to a SaaS mode. Indeed, other embodiments may be implemented as client-server systems, standalone application or mobile application. In addition, no account is required to open a received message. In a preferred incarnation, the method allows four levels of security: Standard, with a password, with SMS code and with a password and SMS code.

Creation of the Communication Key

Now referring to FIG. 1, in a preferred embodiment, whenever a request is made to the server (method), a new communication key is "forged." In such an embodiment, the communication key is valid only during the scope of a single request. Thus, each request is encrypted using different keys. The method 100 typically comprises client [A] 10 establishing communication on [HANDSHAKE] with server [B] 30. The said communication may be established using an SDK, an Outlook™ client, a Gmail™ mobile or web application, browser and all other connectors able to communicate with the server. The HANDSHAKE generally aims at initializing the encryption key to be used to exchange information between A 10 and B 30.
HANDSHAKE Still referring to FIG. 1, as an example, the method comprises A 10 first creating an RSA key 102. The method further comprises initializing the connection 101. During initialization of the connection or handshake 101, A 10 transmits a stored public key [PK1] 12 to B 30. The method further comprises B 30 creating an RSA key 132 and, if necessary, associating the created key with an ID 36 as a reference 136.

The associated ID 36 is typically used to serve multiple requests of the same client during a specific session. In some embodiments, the session has a short life time. One communication between a sender and a recipient is consider to be sessions. A specific sender will create multiple sessions with multiple ID for multiple recipients.

The method further comprises B 30 transmitting the public key referring to the ID [PK2] to A 10. The method 100 further comprises B 30 creating a half key 134 [COMKEY1] 34, typically being a 128-bit key. Upon creating COMKEY1 134, B 30 returns the following information to A 10: PK2 32, ID 36, and COMKEY1 34 (step 138). The method 100 further comprises B 30 encrypting PK2 32, ID 36 and COMKEY1 34 using the public key of the recipient A (PK1) 12 and B 30 sending the encrypted PK2 32, ID 36 and COMKEY1 34 information to A 138. Upon reception of the encrypted information, A 10 may decrypt the information using the private key 11 associated with public key of A (PK1) 12. After decrypting the information, A 10 may forge or create a 128-bit half key 104 [COMKEY2] 14. A 10 may the PK2 34 to encrypt a request to B 20 and to send the encrypted COMKEY2 14 value (step 108) to A 10.

Upon reception and decryption of COMKEY2, B 30 now has the complete definition of the algorithm to assemble the COMKEY 20 by combining COMKEY1 34 and COMKEY2 14 (step 139). Understandably, any known method for combining COMKEY1 34 and COMKEY2 14 may be used.

In embodiments the key 20 is associated with an ID, A 10 sends ID to B 30. A 10 now holds COMKEY1 34 and COMKEY2 14. So, A 10 forges COMKEY 20 using a chosen algorithm. B 30 may further forge COMKEY 20 on reception of COMKEY2 14 from A 10 (step 108) using the chosen algorithm. The communication of the ID 36, COMKEY1 34 and/or COMKEY2 14 between A 10 and B 30 are preferably encrypted using the public key of A 10 or B 30 (the recipient of a communication) 12, 32. As an example, if A 10 sends COMKEY2 14 to B 30, B 30 is the recipient and COMKEY2 14 is encrypted using PK2 32. Once forged, the COMKEY 20 may be used to exchange information.
Exchange of Information Now referring to FIG. 2, in some embodiments, the system and method to securely exchange messages uses a standard security protocol, such as SSL. The system may further comprise a security layer specific to the system. Each exchange between the Client A 10 and the Server B 30 is encrypted with the symmetric COMKEY 20 previously forged (see FIG. 1).

After creating the communication key COMKEY 20, Client A 10 forges an end-to-end key 112, such as but not limited to a symmetric key (AES), typically a 256-bit symmetric key. The forged end to end key 22 is used for "point-to-point" encryption [ETEKEY]. The end-to-end key or ETEKEY 22 is only known to A 10. ETEKEY 22 may be used to send the sensitive information to the server such as the contents of the email, for example, the body of the message [BODY] 23 and the attachments [FILES] 25.

As explained above, Client B 30 is not aware of the ETEKEY 22. The ETEKEY 22 is divided into two portions, namely ETEKEY1 18 and ETEKEY2 19. In a preferred embodiment, each portion of ETEKEY 22 comprises 128 bits.

The method further comprises the Client A 10 sending to B 30 a communication packet 26 encrypted using COMKEY 20 (step 115). The encrypted packet 26 typically comprises information used by the server must to retrieve information, such as recipient, subject, expiration, message settings, ETEKEY2 19, etc. A 10 encrypts sensitive information, such as BODY 23 and FILES 25 using the ETEKEY 22. Thus, Server B 30 is not able to decrypt this content.

In some embodiments, the encrypted message 21 is protected with a unique code, such as a password or SMS code. In such embodiments, the encrypted message 21 is associated with the unique code at the time of sending the said message. The unique code is typically integrated to the ETEKEY1 in manner to forge an ETEKEY1A which may only be changed back to ETEKEY1 by using the unique code.

As an example, the method may comprise using a hash function to create a byte array from the unique code, typically a 128-bit array. The method may further comprise executing an XOR mask function on the ETEKEY1 18 with the created byte array to create the resulting ETEKEY1A key. In such example, the number of possibilities resulting from the bit shifting is $2^{128}$ (3.4028236692093846346337460743177e+38).

To obtain the original value of ETEKEY1 18, the unique code or password is required. Following the previous example, the XOR mask function based on the unique code is executed on the ETEKEY1A to retrieve the original value of ETEKEY1.

Indeed, the generation of a new ETEKEY 22 requires the values of ETEKEY1 18+ETEKEY2 19. In a highly secure embodiment, the unique code or password may not be retained by the server or any client. The password is used to alter ETEKEY1 18 and then discarded. In such an embodiment, the sender must disclose the password to the recipient, ideally through another communication channel.
The Storage In some embodiments, the encrypted message 21 may be kept or stored for further usage. Typically, to keep the encrypted message, the Server B 30 creates a storage key (STOREKEY) 40 preferably a 256-bit key. In some embodiments, a message identification (MSGID) 41 is created and allows the identification of the stored message 21. The message data is typically stored in a database, encrypted with the STOREKEY 40 and associated with the MSGID 41.

In embodiments associated with an SMS code, a hash function is executed on the SMS code, such as creating a 128-bit byte array. The method further comprises executing a bit shift function, such as XOR mask, on the MSGID 41. In such embodiments, the number of possibilities resulting from the bit shifting is $2^{128}$ (3.4028236692093846346337460743177e+38). The method may further comprise B sending an SMS message to the recipient chosen by A when an action is executed by the recipient, such as but not limited to accessing the message. The SMS message comprises the code needed to retrieve the MSGID associated with the content of the message. A skilled person in the art shall understand that the current invention is not limited to the use of an SMS message, but that other means known in the art could be used, such as a message sent via social networks or other existing or future communication protocols.

The method further comprises splitting the STOREKEY 41 into two parts [STOREKEY1 38 and STOREKEY2 39]. Server B 30 keeps the STOREKEY1 38 associated with MSGID 41 and may use the STOREKEY1 38 to retrieve and decrypt the stored message 21 at a later time.

Before returning the response to A 10, Server B 30 may communicate with an external system, such as the Secure Exchanges Mail System [SEMS] 50. The communication may contain a request for the SEMS to generate a public key 150 [SEMSPK] 52. In some embodiments providing minimal security, the SEMS 50 may be hosted on the same server as B 30. Understandably, in other embodiments, the SEMS 50 may be hosted on a different server as B 30 to increase the security level.

Upon generation of the public key SEMSPK 152, the resulting SEMSPK 52 may be returned to the Server B 30.

The message 42 created by the server B then comprises at least the MSGID 41 and the STOREKEY2 39. The message 42 is encrypted using the COMKEY 20. The message 42 may further comprise the SEMSID 54, the SEMSPK 52 and an HTML message or incomplete link 116 (see below).

The message 42 created by the server B is then returned or communicated to the Client A 10 (step 142).

The URL

As discussed above, the Server B 30 creates a message 42, such as an HTML message. The message 42 may comprise an incomplete link 16, such as a URL. The link is incomplete as B 30 does not keep or have access to all the necessary information to forge the final link. Since only A 10 holds the complete information, A 10 creates the complete link 16 or complete the otherwise incomplete link 16 created by B 30 (step 116).

In a preferred embodiment, the complete link 116 comprises the identification of the public key of SEMS 54 (SEMSID), a first portion of the end-to-end key (ETEKEY1) 18 or (ETEKEY1A). The complete link 116 is typically encrypted using the public key of the SEMS (SEMSPK 52) associated with the identification of the public key (SEMSID) and/or the MSGID 36. In some embodiments, the SEMSPK 52 and/or the MSGID 36 may be altered by the unique code (password, SMS code, etc.) and encrypted with the public key SEMSPK 52 associated with the identification of the key 54.

Assembling the Message

Upon reception of the message from the Server B 142, the Client A 10 create the message to be sent to the recipient 27. The message 27 typically comprises a body of text, such as HTML text, the recipient, the subject and the URL 116.

Sending the Email

When sending the information to the SEMS 50, Client A 10 selects a method of sending the message 27. Typically, Client A 10 uses parameters identifying the current system or an email server 60, such as a personal SMTP server, as the method of sending the message.

If, for any reasons, A 10 may not directly send the message 21, A 10 may send the message 27 to the server SEMS 50 (step 160). In such a case, the Client A 10 may encrypt one or more parameters of the link (see the message 27) with the SEMSPK 52 and add the SEMSID 54 to the message 27. SEMS 50 sends the message 154 instead of A 10 sending the message. In other cases, A 10 may directly send the message 162 comprising a correctly generated URL 16 using an outgoing email server 60. Understandably, the message 27 may be an HTML message or any other predetermined type of message, such as XML.

In a typical embodiment having a message 27 coming from the server 50 used by A 10, the message 27 received by the recipient may appeared as from [sender] @ hisdomain.com. In other embodiments where the SEMS 50 sends the email 154, the email may appear as to be from another email address, such as no-reply@secure-exchanges.com. In such embodiments, the message may comprise a mention that the message 27 is sent on behalf of A or the sender.

In embodiments where the message 27 is sent 162 via an outgoing serve 60, such as a standard SMTP server using the SMTP protocol, the message data 23, 25 is stored on one or more servers of the system. The recipient receives a message 27 comprising a link 16 to the content of the message 27. The link 16 typically comprises a URL directed to the system portal (also available as a white label). The portal provides an interface to retrieve confidential information. In other embodiments, the system may comprise one or more connectors installed on a client device, typically as an add-on to a messaging software. The said connectors may, for example, be "plug-ins" in Outlook™, Gmail™, Thunderbird™ or any other messaging software. The connector typically decrypts the message automatically as soon as it arrives in the inbox. Understandably, the connector may be further configured to let the receiving user to click on a link contained in the message. The link may be configured to redirect the computer of the user to a web browser in which the message will be displayed.

Retrieving the Message

Figure 3:
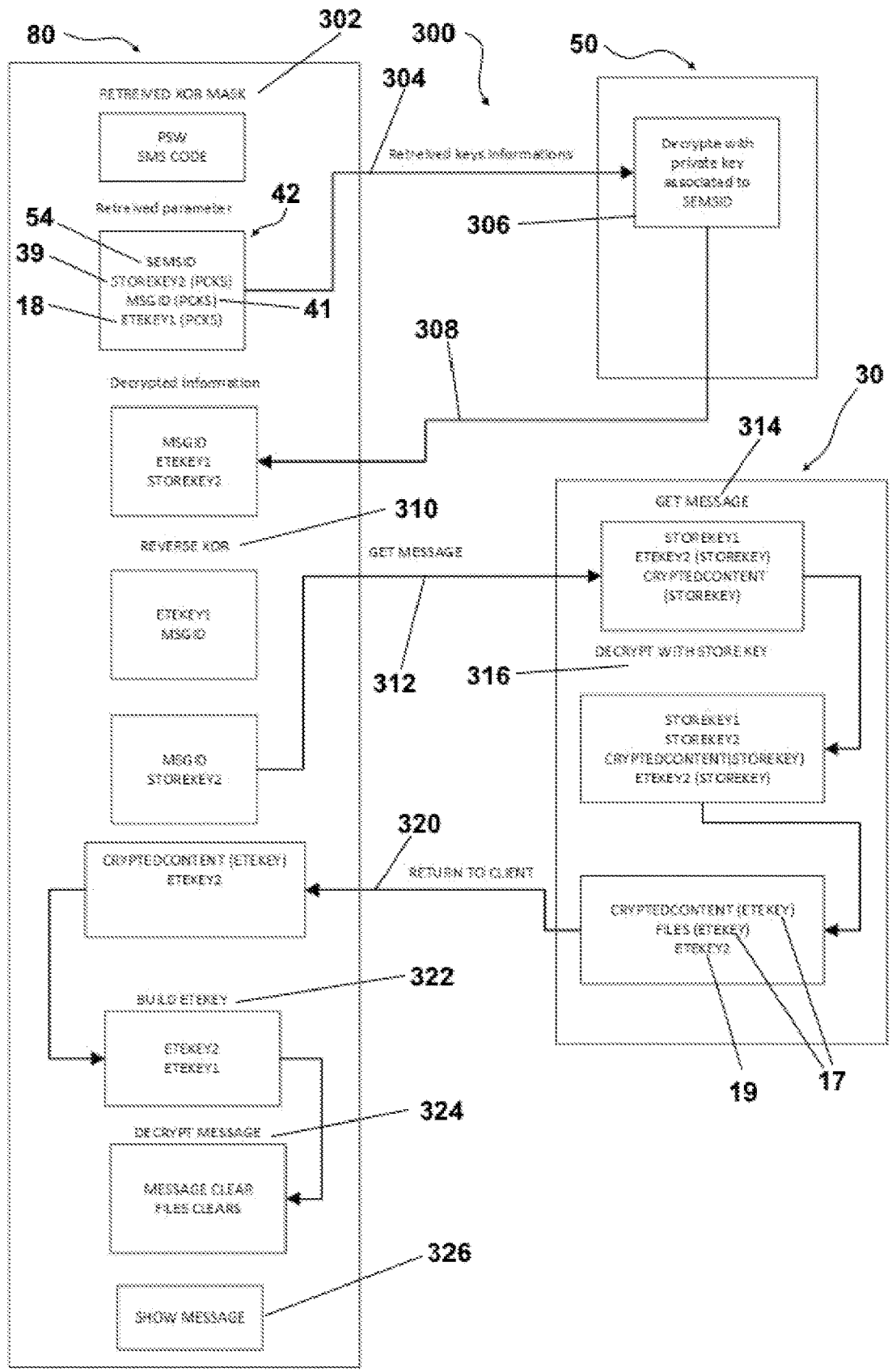
FIG. 3 is a diagram of an embodiment of the retrieval of a message secured with a method and system for securely exchanging messages in accordance with the principles of the present invention.

Now referring to FIG. 3, a method to retrieve a message 300 secured using the method 100 described above is illustrated. In such a method, a recipient 80 or at least the computerized device of a recipient 80 received an electronic message comprising a link to a secured message. In embodiments where the message is secured using a unique code, the method 300 may comprise the recipient 80 retrieving or getting the unique code through another channel of communication, such as the sender 10 calling the recipient 80, a SMS message containing the unique code being sent to the recipient 80 or any other type of two-step authentication method. The client device of the recipient 80 thus create a XOR mask based on the unique code 302, such as using a hash function as described above. Understandably, in such embodiments, the method used to create the XOR mask shall be the same or the reverse as the one to secure the message (see above method 100).

The method 300 comprises retrieving the parameters 42 from the received link. The parameters may comprise the identification of the SEMS public key 54 or the SEMS public key 52, a portion of the storage key 39 or the storage key 40, the message identification 41 and/or a portion of the end-to-end key 18.

In embodiments using a secure outgoing mail server or SEMS 50, the retrieved parameters 42 are encrypted using a public key 52 of the secure outgoing mail server 50. The method 300 may thus further comprise sending a request to the outgoing mail server 50 to decrypt the retrieved parameters 42 (step 304). Upon reception of the request, the SEMS 50 retrieves the private key associated with the SEMSID 54, or if only one key exists, uses the private key of the SEMS, to decrypt the retrieved parameters 42 (step 306). The decrypted parameters 42 are then sent to the client device of the recipient 80 (step 308).

In embodiments where the message is secured using a unique code, the created XOR mask is applied on the retrieved portion of the altered end-to-end key (ETEKEY1A) 310 to obtain the original portion of the end-to-end key 18.

The client device of the recipient 80 now holds a first portion of the ETEKEY1 18. Using the communication key 20 to encrypt the request, the client device of the recipient 80 send a request to get the message to the server 30 (step 312). The request comprises the message identification number 41 and typically comprises a portion of the storage key 39 (STOREKEY2).

The method 300 further comprises the server 30 retrieving the message associated with the message identification 41 (step 314). In embodiments where the stored message is encrypted on the server 30, the server 30 fetches another portion of the storage key 38 (STOREKEY1) associated with the received portion of the storage key 39. Both portions 38 and 39 forge a storage key 40 used to decrypt the retrieved content from storage 316. Understandably, in other embodiments, any other known method to encrypt/decrypt the content may be used, such as the server 30 using a single storage key 40 known only to the server.

The content retrieved from the storage is encrypted with the combined end-to-end key 17. The method 300 further comprises the server 30 sending to the client device of the recipient 80 the retrieved content and a second portion of the end-to-end key 19 (step 320). Such content is send using the communication key 20. The method 300 further comprises the client device of the recipient 80 combining the known portion of the end-to-end key 18 (ETEKEY1) with the other received portion of the end-to-end key 19 (ETEKEY2) to build the end-to-end key 17 (step 322).

The client device of the recipient 80 may now have access to the crypted content by decrypting the said content using the end-to-end key 17 (step 324). The method 300 may further comprise the device 80 displaying the decrypted content to the recipient.

The Envelope

Figure 4:
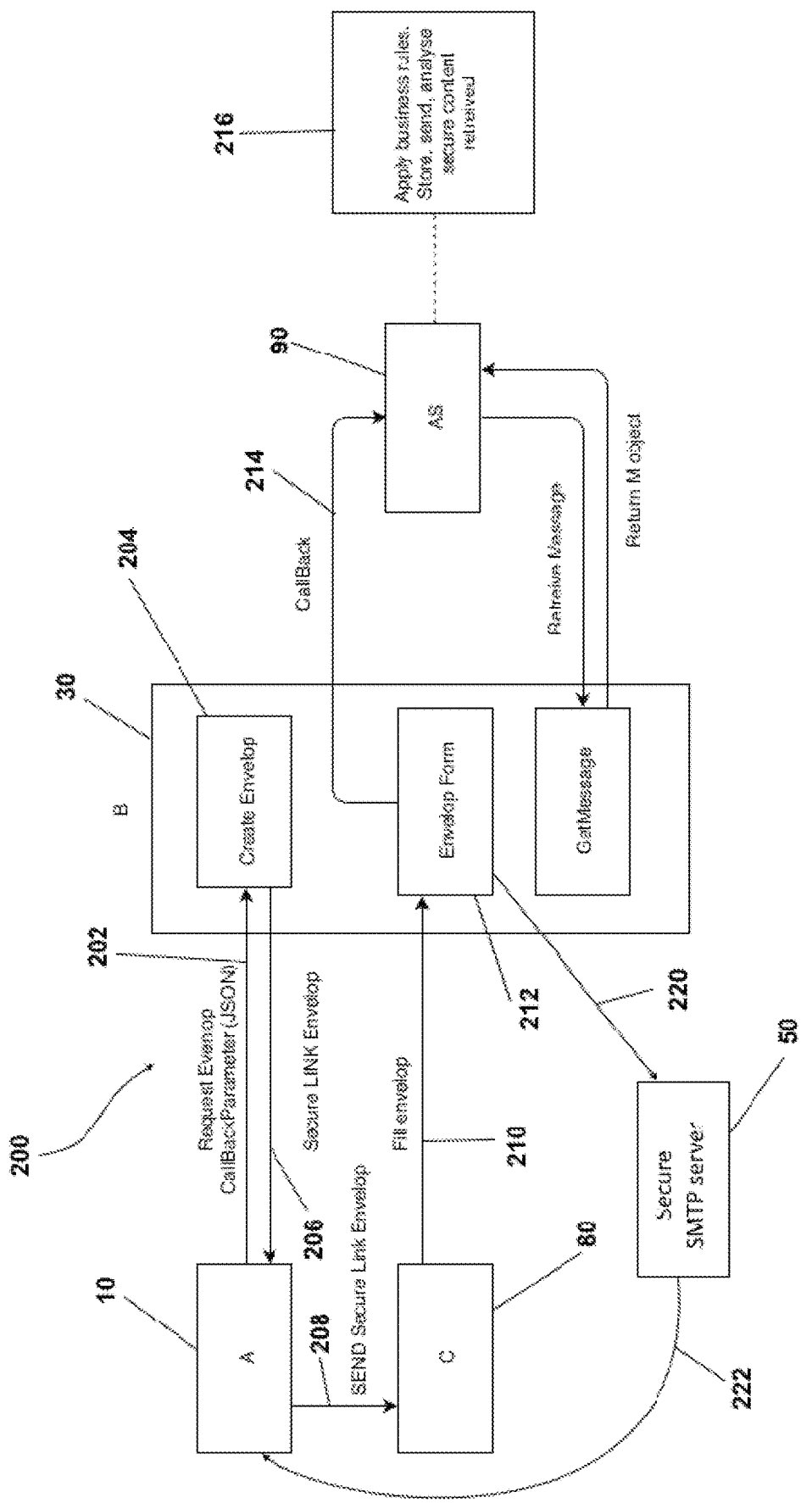
FIG. 4 is a diagram of an embodiment of a method to request sensitive information from a recipient and to establish a secure communication with the recipient in accordance with the principles of the present invention.

Now referring to FIG. 4, a method of dynamically creating a link in an exchanged message to send content 200 is provided, also referred as the envelope method. Broadly, the method 200 comprises the Client A 10 sending to the recipient C 80 a message comprising a unique link.

As an example, the unique link may be configured to redirect the device of the user to an application configured for C 80 to send to A 10 confidential information and to encrypt point to point the message. In some embodiments, the application is a web page. In such embodiments, the web page may comprise an editor adapted for C 80 to write a message. The web page may also comprise an upload button configured to trigger the upload of confidential documents encrypted to the server.

The present method is typically embodied by using the method to secure content as described above 100 and the method to retrieve secure content as described above 300. The said methods 100 and 300 shall be adapted as the recipient device 80 now acts as the client device 10 to secure the content of the envelope (see method 100) and the client device acts as the recipient device 80 by decrypting the content (see method 300)

Figure 2:
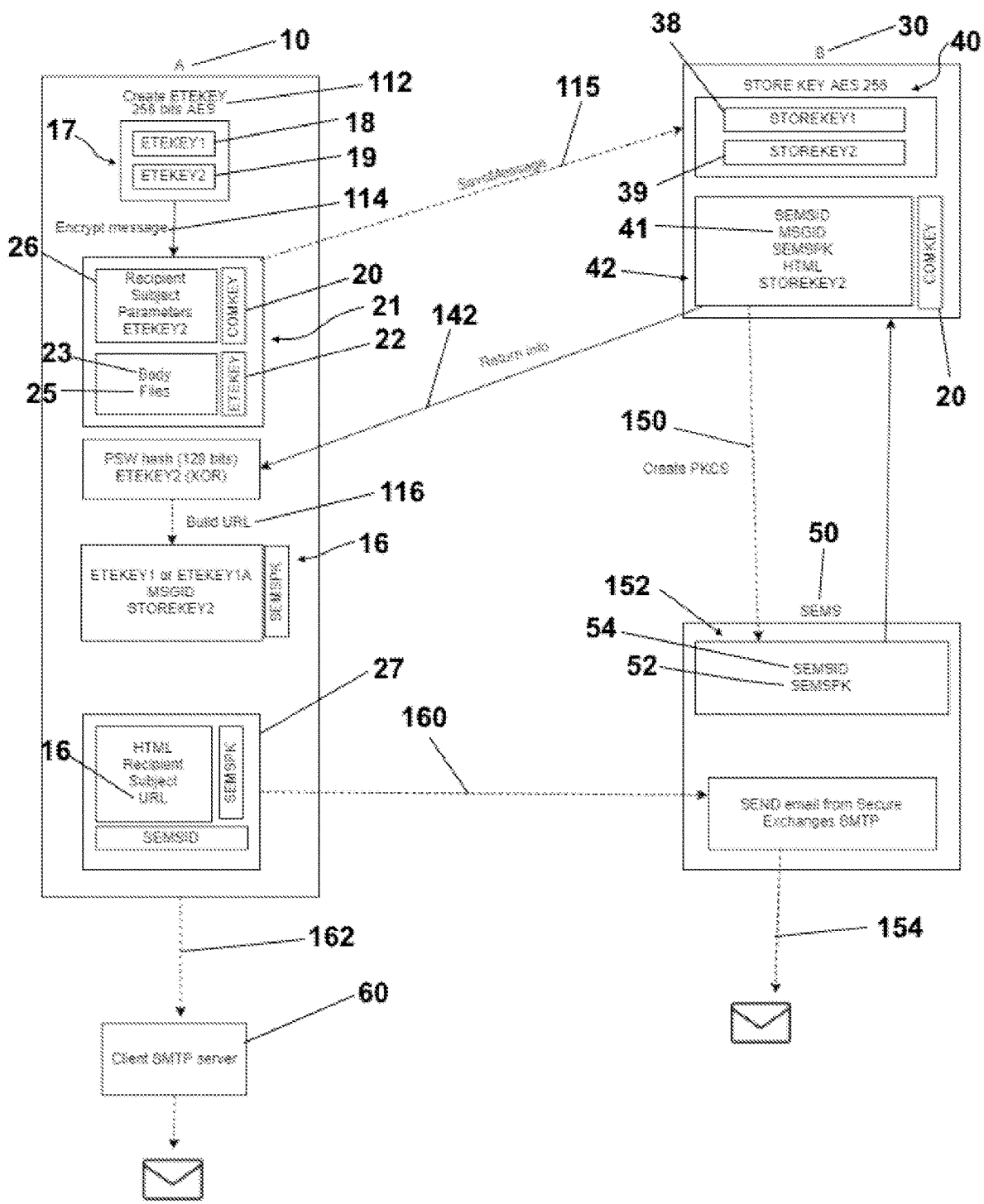
FIG. 2 is a diagram of an embodiment of a method and system for securely exchanging messages in accordance with the principles of the present invention.

In yet other embodiments, the encryption is performed using the browser, typically via a JavaScript library or program (see the illustration of the ETEKEY concept of FIG. 2). In such embodiments, the browser is configured to act as the client device 10 in the above-described method 100. All files or content sent to the server 30 are encrypted using an ETEKEY 22. Each communication is also encrypted using the COMKEY 20 as described above in methods 100 and 300.

In such an example, the encryption process aims at removing or avoiding having confidential information in the mailbox of the recipient C 80.

The method 200 typically comprises the client A 10 sending a request to the server B for an envelope 202. The method 200 further comprise creating the envelope 204, typically the server 30 creating the envelope. The method 200 further comprise generating a secure link to the envelope and sending the link 206 to the client A 10. The client A then sends the received link to the recipient C 80 (step 208).

The method 200 may further comprise the recipient 80 filling the envelope with content to be securely transferred, such as text, files or other type of data. To access the envelope, the recipient 80 device uses the received link to the envelope. The filing of the envelop may be done by accessing a web page comprising controls adapted to input text or to upload files to be secured 212. Understandably, the recipient 80 may use a standard program executing on the device of the recipient 80 and configured to fill the envelop, such as a mobile application or a desktop application.

In some embodiments, the now filled envelope is encrypted and communicated using the system and method to for securely exchanging messages 100 as described above.

In yet other embodiments, the envelope is encrypted by the server 30 in order for the client 10 to decrypt the envelope. The envelope may be communicated to a secure outgoing mail server 50 or to a normal outgoing mail server 220. The outgoing mail server 50 then communicate the encrypted envelope 222 to the client device 10. Understandably, as explained above, the server 30 may be configured to encrypt the envelope using a public key of the secure outgoing mail 50 to ensure increased security in the communication between the server 30 and the secure outgoing mail server 50.

In some embodiment, the step to request the envelope 202 may further comprise the client A 10 providing callback parameters or instructions to add to the requested envelope. In some embodiments, the callback parameters are translated or converted into a readable or text-based format, such as a JSON objection.

Upon reception of the request of the envelope 202, the server B 30 creates the envelope 204. If the request comprises callback parameters, the server B 30 store and encrypt the received callback parameters in the created envelope. Understandably, in alternative embodiments, the callback parameters could be created by the server B 30 at the time of the creation of the envelope 204 upon reception of instructions from the client A 10. When the recipient fills the envelop 210, the server 30 may be configured to call one or more services or processes associated with the callback parameters and/or to execute the callback instructions 214.

In a preferred embodiment, a secured communication channel is established between the server 30 and the service provider 90. As an example, such secured communication channel may be use to communicate the link to the envelope to the service provider 90.

As an example, if a password or an SMS code is provided in the message associated with the envelope, the service provider 90 may be configured to fetch or retrieve the said password or SMS code in order to retrieve the message. In this example, if the recipient 80 provides the same password or the exact SMS code, the service provider 90 shall be able to retrieve the service provider 90. In such a case, the server B 30 may communicate the message of the envelope to the service provider 90. The message typically comprises encrypted text content, data files and/or the callback parameters. The service provider 90 is configured to decrypt the message using the method 100 described above by forging the communication keys from the information contained in the link to the envelope, such as the URL, the SMS code, the password and other parameters contained in the message.

At this point, the service provider 90 may apply the callback parameters or execute the provided callback instructions following predetermined rules 216, such as business rules.

In a preferred embodiment, the envelope method may be performed by a connector integrated with messaging software, such as Microsoft Outlook™.

To create a unique and secure communication channel, A asks B to generate a unique link. In some embodiments, the link may be generated using the connector. For example, the link may be generated upon activating a button displayed by the connector. The link generally comprises instructions for directing C to the "portal" of the system (which may be hosted as a white label solution). By following or clicking the generated link, C is directed to the portal application. The portal application is configured to allow the upload of the message and the encrypted confidential documents using point-to-point encryption, as described above.

The link may also comprise a reference to a unique identifier for each envelope. This unique reference typically comprises the recipient information as well as several opening and notification settings.

In some embodiments comprising a reference, the reference is destroyed once it has been used so it cannot be used twice. All the protocol for creating the link of the envelope may be encrypted with the communication keys COMKEY described above (see Creation of the communication key).
Example Use with Credit Cards In cases where a credit card number must be exchanged using a message such as to complete an account registration. A user (the sender) uses an email application to write an email, identify the recipient and insert a return envelope using, as an example, the button added by the connector in Outlook™. The recipient receives the sent email comprising a return link. The recipient clicks on returns link and is redirected to a portal. The recipient may then enter the desired confidential information using the portal application. In the present example, the recipient enters a credit card number. When done, the recipient clicks on a button to return an encrypted email to the sender.
Example of Use with Sensible or Massive Document In another example, a user may wish to retrieve sensitive documents from another user, such as but not limited to accounting database backups, patent documents or any other documents deemed confidential. The user sends a return envelope to the user from which documents must be retrieved, using the above-described method. The system sends an email to the original user which comprises encrypted sensitive documents.

In embodiments using a connector in an email client, the connector may be configured either to automatically decrypt the documents or to wait for an operation from the recipient. Once the documents have been retrieved, the system may be configured to either keep such documents in a safe "vault" or to store encrypted document on any other storage location, such as on a hard disk drive.

Message Expiration

Each sent message is stored in a database. In some embodiments, the data is encrypted, and/or the system does not hold the encryption keys to decrypt the messages. In other embodiments, the system may be configured to destroy the copy of the message upon accessing the content of said message. In yet other embodiments, the server may also keep a copy for a predetermined period of time or for an indefinite period of time, depending on the sender's choice.

In some embodiments, a lifespan or a maximum number of openings may be associated with a message. The lifespan or opening limit may be set by the sender. In such embodiments, the method further comprises a step for automatically deleting the message from the server when the limit is reached. Each message may also be associated with a maximum number of trials. The number of trials may be set in the server configuration. This number typically depends on a rule associated with the company holding a license. Once the maximum number of trials is reached, the messages and the associated attachments are destroyed.
Message Size Since the message does not reside in the sender's mailbox and does not end up in the recipient's mailbox, each message may contain several gigabytes of data. As an example, it is possible to send an email with attachment up to 2 GB to a mailbox that only allows 15-MB messages. Understandably, the size of the email is not limited by the email servers but by constraints on hosting server.

In such embodiments, each attachment is uniquely encrypted as described above.

Figure 5:
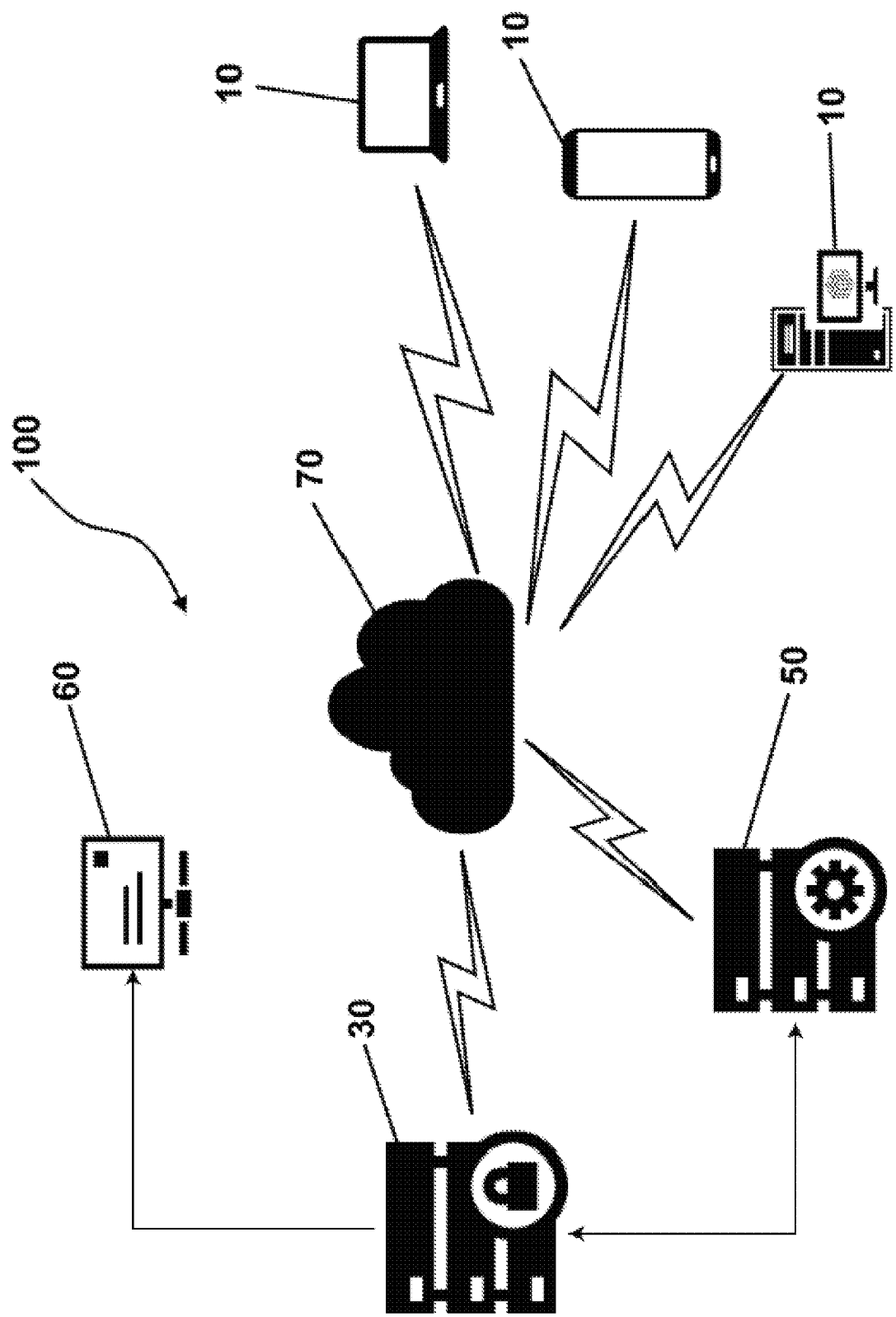
FIG. 5 is an architectural diagram of an embodiment of a system for securely exchanging messages in accordance with the principles of the present invention.

Now referring to FIG. 5, the system 100 typically comprises one or more computerized device 10 acting as a client device and a server 30 configured to store the content of the message. The system 100 may further comprise a SEMS server 50 in communication with the client computerized device 10 and the server 30. The SEMS server 50 may be configured to act as an outgoing mail server or execute an outgoing mail server.

The system may 100 further comprise an outgoing server 60 configured to be in communication with the computerized device.

The one or more client devices 10 and the server 30 are configured to communicated through a data network 70, such as a LAN or the Internet. In embodiments having a SEMS server 50, the SEMS server 50 is further configured to communicate with the client devices 10 and the server 30 through the network.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method to request sensitive data from a recipient and to establish a secure communication with the recipient, the method comprising:
a client device sending a request for an envelope to a server;
the server creating the envelope;
sending to the recipient device an access to the envelope;
the recipient device filling the envelope with sensitive data;
storing and encrypting the sensitive data on the server using a first key known only by the server;

sending to the client device a secured access to the sensitive data, the communication to the secured access being encrypted with a second key known to the server and to the client device.

2. The method of claim 1, the method further comprising:
generating a first link to the envelope to provide the access to the envelope;
sending the generated first link to the recipient device.

3. The method of claim 1 further comprising:
generating a second link to the sensitive data to provide the secured access to the sensitive data;
encrypting the second link with the second key;
the client device gaining the secure access to the sensitive data through the second link.

4. The method of claim 3, sending the first link to the recipient device further comprising:
sending the first link to the client device;
the client device sending the received first link to a device of a recipient.

5. The method of claim 3, the encryption of the second link using a method for securing an electronic message.

6. The method of claim 5 wherein the method for securing the electronic message comprises:
the client device creating a first key unknown to the server, the first key having at least two portions;
encrypting sensitive data using the first key;
communicating a communication message comprising a first of the at least two portions of the first key and the encrypted sensitive data to the server;
storing the encrypted sensitive data on the server;
generating parameters associated with the stored encrypted sensitive data, the parameters comprising a unique identification associated with the stored encrypted sensitive data;
communicating the parameters to the client device;
the client device further adding a second of the at least two portions of the first key to the received parameters;
the client device creating an electronic message comprising the received parameters;
the client device sending the created electronic message to a recipient.

7. The method of claim 3, the decryption of the second link using a method for the recipient device to retrieve a secure electronic message.

8. The method of claim 7, the method for the recipient device to retrieve the secure electronic message comprising:
the recipient device receiving a secured access to the secured message;
retrieving parameters associated with the secured access, the retrieved parameters comprising identification of the secure electronic message and a first portion of an end-to-end key;
the recipient device requesting the secured message associated with the identification of the secure message to the server;
sending content of the secured message encrypted with the end-to-end key and a second portion of the end-to-end key to the recipient device;
the recipient device combining the first portion of the end-to-end key and the received second portion of the end-to-end key to forge the end-to-end key;
using the end-to-end key to decrypt the content of the secure electronic message.

9. The method of claim 1 further comprising adding callback parameters to the requested envelope.

10. The method of claim 9, wherein the callback parameters provided as one or more objects.

11. The method of 5, the server encrypting the callback parameters in the created envelope.

12. The method of claim 9, the client device providing the callback parameters in the request for the envelope.

13. The method of claim 9, the server executing one or more actions associated with the callback parameters.

14. The method of claim 13, the server communicating the callback parameters to a service provider server configured to execute predetermined rules associated with the received callback parameters.

* * * * *